United States Patent
Kartalopoulos (12)

(10) Patent No.: US 6,493,118 B1
(45) Date of Patent: Dec. 10, 2002

(54) ADD/DROP CAPABILITY FOR ULTRA-HIGH SPEED DENSE WAVELENGTH DIVISION MULTIPLEXED SYSTEMS USING A WAVELENGTH BUS ARCHITECTURE

(75) Inventor: Stamatios Vasilios Kartalopoulos, Annandale, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/244,216

(22) Filed: Feb. 4, 1999

Related U.S. Application Data

(60) Provisional application No. 60/101,299, filed on Sep. 22, 1998.

(51) Int. Cl.[7] .................................................. H04J 14/02
(52) U.S. Cl. ....................................... 359/127; 359/123
(58) Field of Search ................................. 359/124–134, 359/118, 173, 123

(56) References Cited

U.S. PATENT DOCUMENTS

| | | | | | |
|---|---|---|---|---|---|
| 4,967,405 A | * | 10/1990 | Upp et al. | .................. | 370/1 |
| 5,157,530 A | * | 10/1992 | Loeb et al. | .................. | 359/124 |
| 5,488,500 A | * | 1/1996 | Glance | .................. | 359/127 |
| 5,535,373 A | * | 7/1996 | Olnowich | .................. | 359/500 |
| 5,793,510 A | * | 8/1998 | Samejima et al. | .................. | 358/158 |
| 5,793,770 A | * | 8/1998 | St. John et al. | .................. | 370/401 |
| 5,796,502 A | * | 8/1998 | Haller, Jr. | .................. | 359/124 |
| 6,067,389 A | * | 5/2000 | Hatehi et al. | .................. | 385/17 |
| 6,101,561 A | * | 8/2000 | Beers et al. | .................. | 710/66 |
| 6,124,957 A | * | 9/2000 | Goel et al. | .................. | 359/133 |
| 6,208,443 B1 | * | 3/2001 | Liu et al. | .................. | 359/127 |
| 6,226,111 B1 | * | 5/2001 | Chang et al. | .................. | 359/119 |
| 6,259,555 B1 | * | 7/2001 | Meli et al. | .................. | 359/337 |

* cited by examiner

*Primary Examiner*—Leslie Pascal
(74) *Attorney, Agent, or Firm*—Gregory J. Murgia

(57) ABSTRACT

Parallel-formatted information is selectively removed and inserted in a wavelength division multiplexed network by transporting the parallel-formatted information using selected wavelength channels in a wavelength division multiplexed signal as a parallel bus (a "wavelength bus") and by selectively adding and dropping only information in the wavelength bus at an add/drop node. In one illustrative embodiment, one or more wavelength channels in a wavelength division multiplexed signal are allocated to form a wavelength bus for carrying multiplexed information supplied by one or more sources in a parallel format. At an add/drop node in the network, the wavelength channels in the wavelength bus are separated from the wavelength division multiplexed signal and information to be dropped is selectively removed by demultiplexing the parallel-formatted information. Information to be added at the add/drop node is multiplexed in a parallel format for transmission via the wavelength bus in the wavelength division multiplexed signal. A wavelength division multiplexed signal can be partitioned into multiple wavelength buses so that one or more wavelength buses can be used for carrying information that is to be added and dropped at one or more nodes, while other information can be separately routed in the wavelength division multiplexed signal on a "normal through" basis.

16 Claims, 6 Drawing Sheets

ADD/DROP CAPABILITY FOR ULTRA-HIGH SPEED DENSE WAVELENGTH DIVISION MULTIPLEXED SYSTEMS USING A WAVELENGTH BUS ARCHITECTURE

CROSS-REFERENCE TO RELATED APPLICATIONS

This application claims the benefit of U.S. Provisional Application Ser. No. 60/101,299 filed on Sep. 22, 1998. This application is related to co-pending U.S. application Ser. No. 09/237,122 filed on Jan. 26, 1999.

FIELD OF THE INVENTION

The invention relates generally to lightwave communication systems and, more particularly, to an add/drop capability in dense wavelength division multiplexing systems.

BACKGROUND OF THE INVENTION

Optical fiber has become the transmission medium of choice for communication networks because of the speed and bandwidth advantages associated with optical transmission. Wavelength division multiplexing (WDM), which combines many optical signals at different wavelengths for transmission in a single optical fiber, is being used to meet the increasing demands for more speed and bandwidth in optical transmission applications. With recent advances in optical networking technology, system manufacturers are now contemplating dense wavelength division multiplexing (DWDM) systems that carry, for example, as many as 40, 80, or more channels in a single fiber and with bit rates up to 10 Gbps per channel. In these DWDM systems, aggregate bandwidth in a single fiber is a function of the number of wavelength channels and the bit rate per wavelength channel.

DWDM is generally regarded as a channelized technology because a separate wavelength channel is allocated for carrying traffic from each source or user. Despite the many advantages of DWDM, the channelized nature of DWDM imposes limitations on transporting information in existing systems and networks. For example, wavelength exhaust becomes a problem because the number of users that can be supported by a DWDM system is limited by the number of available wavelengths. The total bandwidth in a DWDM system may also be used inefficiently if all wavelengths are not being used to transport information at the maximum possible bit rate.

In DWDM-based networks, the capability to selectively remove and add information carried by wavelength channels at multiple add/drop nodes across the network is essential for a variety of value-added communication services. For example, in many applications, such as telecommunications networks, optical LANs, and cable television subscriber systems, there may be a need to route one or more channels of a multiplexed optical signal to different destinations. An add/drop capability is especially important in networks that provide service to a large number of users with diverse traffic requirements, such as metropolitan area optical networks. In existing DWDM networks, add/drop functions are typically performed in a channelized manner wherein information is removed and inserted on a per-channel basis, i.e., each wavelength channel is separately managed.

In my co-pending U.S. application Ser. No. 09/237,122 which is herein incorporated by reference in its entirety, a DWDM transport scheme is proposed in which information is transported in a parallel format across a group of wavelength channels using a "wavelength bus" architecture. As described in this co-pending application, the wavelength bus offers a more efficient use of bandwidth for transporting information in a DWDM system. However, conventional add/drop schemes which are based on a channelized approach cannot be used for removing and adding information transported in the wavelength bus.

SUMMARY OF THE INVENTION

The latency problems and bandwidth limitations of prior DWDM transport schemes are overcome and a configurable add/drop capability is provided according to the principles of the invention by transporting information in a parallel format using selected wavelength channels in a wavelength division multiplexed signal as a parallel bus (a "wavelength bus") and by selectively adding and dropping only information in the wavelength bus at an add/drop node. More specifically, one or more wavelength channels in a wavelength division multiplexed signal are allocated to form a wavelength bus for carrying multiplexed information supplied by one or more sources in a parallel format. At an add/drop node in the network, the wavelength channels in the wavelength bus are separated from the wavelength division multiplexed signal and information to be dropped is selectively removed by demultiplexing the parallel-formatted information. Information to be added at the add/drop node is multiplexed in a parallel format for transmission via the wavelength bus in the wavelength division multiplexed signal.

As compared to conventional, channelized DWDM transport schemes, a wavelength bus architecture has many advantages such as more efficient bandwidth utilization, reduced latency because of less serial-to-parallel and parallel-to-serial conversions, and sharing of resources among a group of wavelength channels, to name a few. Coupled with these advantages is a configurable add/drop capability wherein a wavelength division multiplexed signal can be partitioned into multiple wavelength buses so that one or more wavelength buses can be used for carrying information that is to be added and dropped at one or more nodes, while other information can be separately routed in the wavelength division multiplexed signal on a "normal through" basis. As such, a wavelength bus architecture with an add/drop capability is very adaptable and can support multiple users with different add/drop requirements at multiple nodes in a network.

BRIEF DESCRIPTION OF THE DRAWING

A more complete understanding of the present invention may be obtained from consideration of the following detailed description of the invention in conjunction with the drawing in which.

DETAILED DESCRIPTION OF THE INVENTION

In a typical DWDM system, a number of different optical channels, i.e., wavelength channels, within an optical fiber are each used to transport a serial bit stream. As such, DWDM is a channelized technology in which a wavelength channel must be dedicated to carrying only traffic supplied by a single source or user. This type of transport scheme has disadvantages, such as: wavelength exhaustion once all available wavelength channels are assigned; inefficient use of the total bandwidth when not all wavelength channels are being used at the maximum possible bit rate; and limitations on the speed of transport over a given wavelength channel because of limitations in the electronic circuitry used for processing the signals at the receiver, to name a few.

To solve the aforementioned problems, a DWDM transport scheme was proposed in a co-pending U.S. application Ser. No. 09/237,122 filed Jan. 26, 1999, which is herein incorporated by reference in its entirety. In this proposed transport scheme, information is transported in a parallel format in a DWDM system using a parallel bus architecture. A selected number of wavelength channels in a multi-wavelength DWDM signal are allocated or partitioned into a parallel bus transmission group (a "wavelength bus"). Information supplied by one or more sources is multiplexed, such as by byte interleaving, into a parallel format and transmitted at the same transmission rate in each of the wavelength channels of the wavelength bus. According to the principles of the present invention, a configurable add/drop capability is provided for selectively removing and inserting information transported in the wavelength bus.

Figure 1:
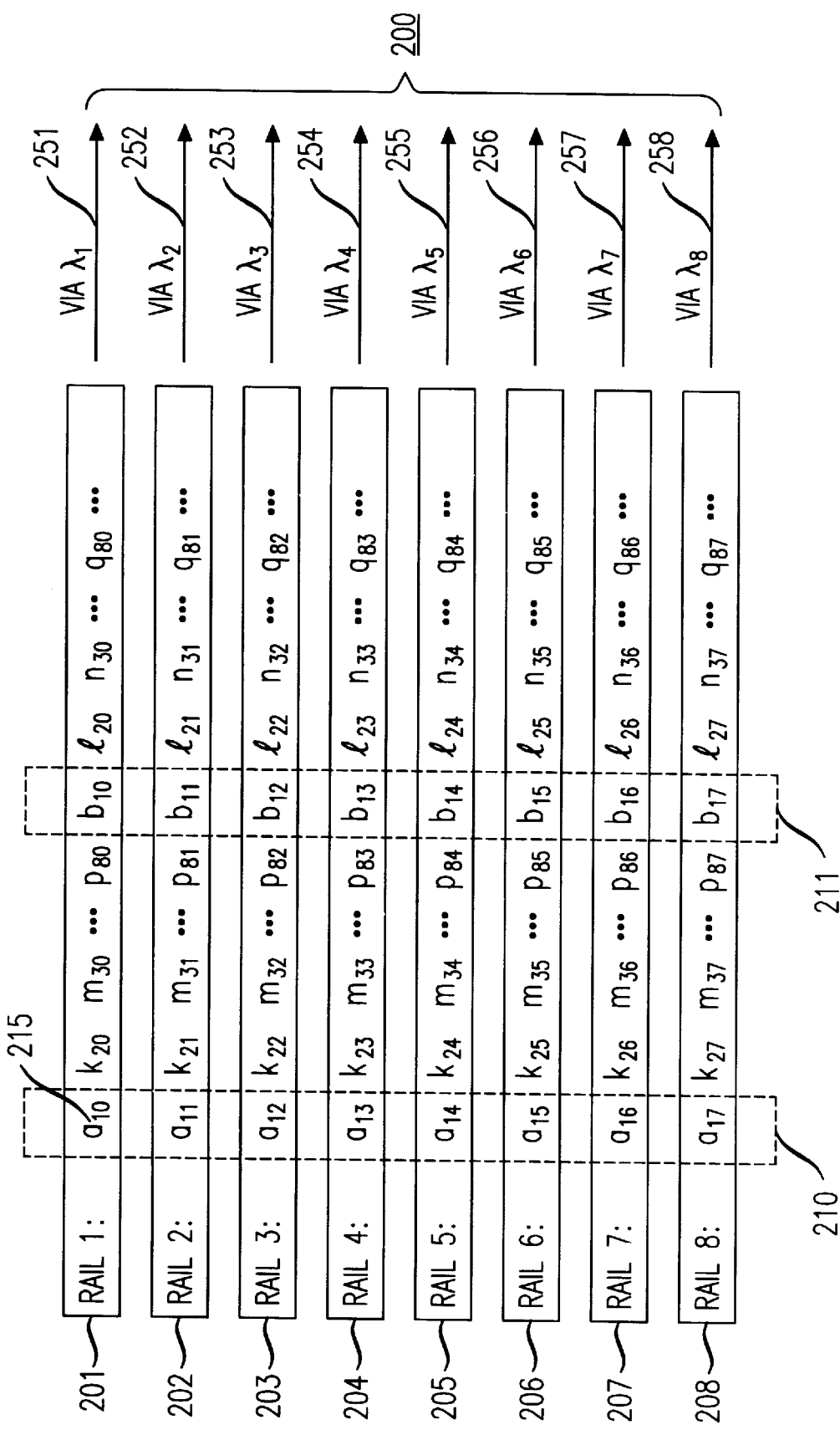
FIG. 1 is a simplified diagram showing one exemplary data structure for transporting information according to the principles of the invention.

The following brief description of the wavelength bus architecture is included to promote a better understanding of the principles of the present invention. Briefly, FIG. 1 shows an example of how data is transported according to the wavelength bus architecture. Wavelength bus 200 comprises wavelength channels 251–258 ($\lambda_1$ to $\lambda_2$) wherein each of wavelength channels 251–258 is used to transport information from one or more sources (not shown) supplied in a parallel format via rails 201–208. As shown, the information to be transported via wavelength bus 200 is organized in bytes using parallel byte interleaving. By way of example, byte 210, the structure of which is representative of the other bytes as well, comprises 8 bits, one of which is shown as bit 215. Byte 210 includes bits $a_{10}$ through $a_{17}$, wherein $a_{10}$ represents bit 0 of byte a supplied by source 1, $a_{17}$ represents bit 7 of byte a supplied by source 1, and so on. Because the data is in a parallel format, each of rails 201–208 includes one bit of each byte, such as byte 210. As a result, wavelength bus 200 is effectively an 8-bit wide bus using 8 different wavelength channels 251–258 to transport each byte supplied via rails 201–208.

In the example shown in FIG. 1, 8-bit bytes are byte interleaved so that bytes from a particular traffic source are repeated every eight parallel bytes. More specifically, byte 210 ($a_{10}$–$a_{17}$) from source 1 is supplied via rails 201–208 so that bit $a_{10}$ is transported in wavelength channel 251 ($\lambda_1$), bit $a_{11}$ is transported in wavelength channel 252 ($\lambda_2$), and so on. The next byte from source 1 is byte 211 ($b_{10}$–$b_{17}$) which is byte interleaved according to a predefined byte repetition rate and transported using the same wavelength channels 251–258 ($\lambda_1$–$\lambda_8$) in wavelength bus 200. In this example, a byte repetition rate is selected so that byte 211 from source 1 is transmitted after intervening bytes from other sources are transmitted, e.g., bytes k and l from source 2, bytes m and n from source 3, bytes p and q from source 8, and so on.

Although each wavelength channel 251–258 still contains a serially transmitted bit stream, parallel byte interleaving results in a parallel transmission scheme whereby a byte of information from any given source is transmitted using all wavelength channels 251–258 of wavelength bus 200. Accordingly, parallel transmission in the wavelength bus requires that each wavelength channel 251–258 in wavelength bus 200 transmit at the same transmission bit rate regardless of the bit rate of the signal sources.

The wavelength bus described in the foregoing embodiment is meant to be illustrative only and not limiting in any way. For example, a byte size of 8 bits was used as an example, but the byte size may be any number of bits. Wavelength bus 200 is also shown to include 8 wavelength channels 251–258, however, wavelength bus 200 may comprise any number of wavelength channels. As will be described in more detail, a single optical fiber carrying a DWDM signal may also have more than one wavelength bus therein. For example, a wavelength a division multiplexed signal can be partitioned into multiple wavelength buses with each wavelength bus sized according to the bandwidth requirements of the traffic to be transported. The wavelength bus is sized by changing the number of optical channels, i.e., wavelength channels, by changing the transmission bit rate for the wavelength channels in the wavelength bus, or by a combination of both. A single wavelength bus can transport a combination of differently formatted traffic (e.g., SONET, ATM, IP, etc.) as well as traffic supplied at different bit rates. Alternatively, because different types of traffic have different requirements, a group of wavelength buses may be partitioned so that each wavelength bus is sized to transport one type of traffic within that wavelength bus. This scalability allows the DWDM signal to be optimally designed according to heterogeneous traffic requirements and allows for a highly adaptable add/drop capability.

Figure 2:
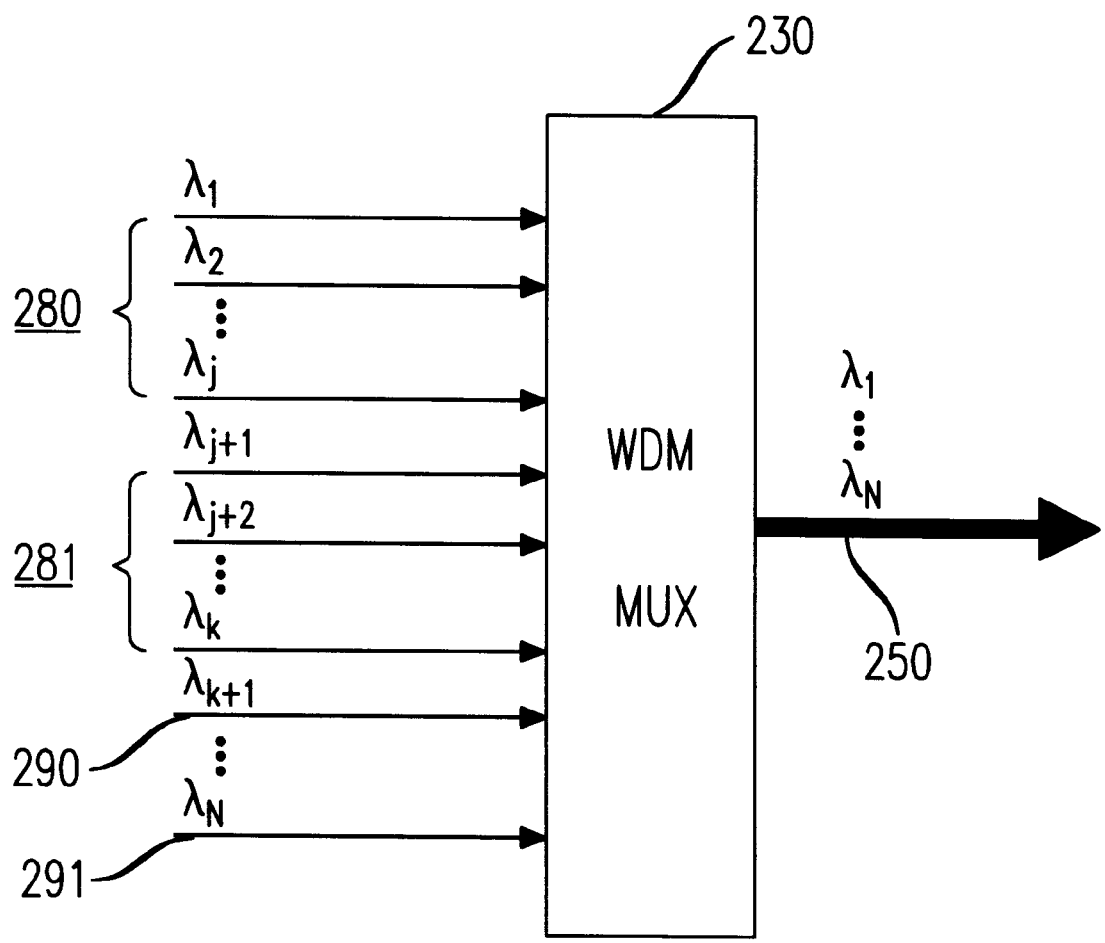
FIG. 2 is a simplified block diagram of one embodiment of a wavelength bus architecture according to the principles of the invention.

In particular, FIG. 2 illustrates the scalability advantages of using a wavelength bus architecture to provide an add/drop capability. As shown, a wavelength division multiplexer 230 multiplexes many different wavelength channels ($\lambda_1$–$\lambda_N$) for transmission in a single optical fiber 250. In this example, wavelength channels ($\lambda_1$–$\lambda_j$) are allocated to form wavelength bus 280, wavelength channels ($\lambda_{j+1}$–$\lambda_k$) are allocated to form wavelength bus 281, and wavelength channel 290 ($\lambda_{k+1}$) through wavelength channel 291 ($\lambda_N$) can be used for conventional DWDM transport and not grouped into wavelength buses. Accordingly, a DWDM signal transported in optical fiber 250 may have one or more wavelength buses, each of which may have any number of wavelength channels, and the wavelength buses may be used in conjunction with conventional transport schemes within the same DWDM signal. As will be described in more detail, one or more of the wavelength buses may be used for providing add/drop service, while other wavelength buses or individual wavelength channels may be used for normal routing. It should be noted that the size and number of wavelength buses may vary so this embodiment is only meant to be illustrative and not limiting.

Figure 3:
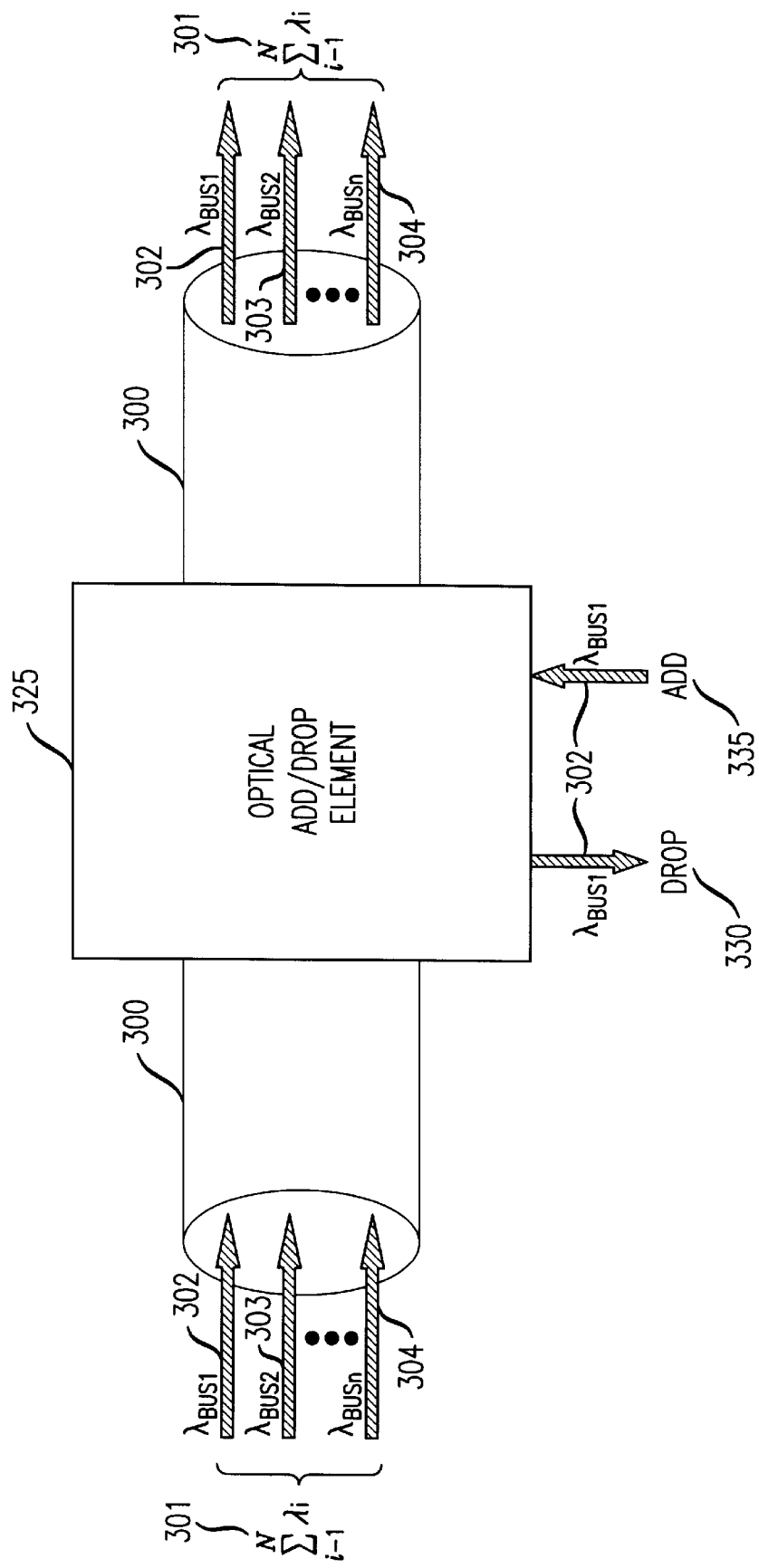
FIG. 3 is a simplified block diagram of one embodiment of an add/drop arrangement for use in a system employing the wavelength bus architecture according to the principles of the invention.

FIGS. 3–6 illustrate several exemplary embodiments of add/drop arrangements that can be used with a wavelength bus architecture according to the principles of the invention. FIG. 3 is a simplified block diagram in which a single optical fiber 300 transports a DWDM signal 301

$$\sum_{N}^{i=1} \lambda i,$$

where i and N are integers. As shown, DWDM signal 301 is partitioned into n wavelength buses 302–304, represented as $\lambda_{BUS1}$, $\lambda_{BUS2}$ through $\lambda_{BUSn}$, respectively. It should be noted that wavelength buses $\lambda_{BUS3}$ through $\lambda_{BUSn-1}$ have been omitted for simplicity of illustration and explanation. As previously described, each wavelength bus may include any number of wavelength channels, as long as the total number of wavelength channels in each of the wavelength buses together do not exceed the N wavelength channels available in DWDM signal 301.

At an add/drop node at some point in a DWDM network or system, optical add/drop element 325 is coupled to optical fiber 300 for adding and dropping selected wavelength channels from DWDM signal 301. As will be described in more detail below, add/drop element 325 may be implemented using well-known wavelength-selective devices capable of separating the constituent wavelength channels from a DWDM composite signal. Briefly, examples of wavelength-selective devices include, but are not limited to, optical filters, Mach-Zehnder devices, fiber gratings, directional optical couplers, passive optical couplers, and the like.

According to the principles of the invention, add/drop service can be provided by allocating a separate wavelength bus within DWDM signal 301 to carry the information that is to be dropped and added at the selected add/drop node. In the example shown in FIG. 3, wavelength bus 302 ($\lambda_{BUS1}$) carries the information to be dropped and added in DWDM signal 301. More specifically, add/drop element 325 separates the wavelength channels in wavelength bus 302 ($\lambda_{BUS1}$), which carry the information that is to be dropped, from DWDM signal 301 and routes these channels for processing in drop path 330. Similarly, information to be added to DWDM signal 301 is supplied via add path 335 for transport in wavelength bus 302 ($\lambda_{BUS1}$).

Using the wavelength bus architecture in this manner, the remaining wavelength buses 303–304 may be used for transporting "express" traffic or "normal through" traffic. Consequently, a configurable add/drop capability can be provided by partitioning DWDM signal 301 into multiple wavelength buses 302–304 and managing the transport of traffic within the various wavelength buses according to user-defined requirements. For example, the information carried within DWDM signal 301 may be allocated for transport in wavelength buses 302–304 according to traffic type (e.g., IP, ATM SONET, etc.), destination routing (e.g., a corresponding wavelength bus for each add/drop node), by user, by transmission characteristics (e.g., bandwidth, delay, etc.), or by any other user-selectable attributes. In sum, the wavelength bus architecture promotes a highly adaptable add/drop function for DWDM transport.

Figure 4:
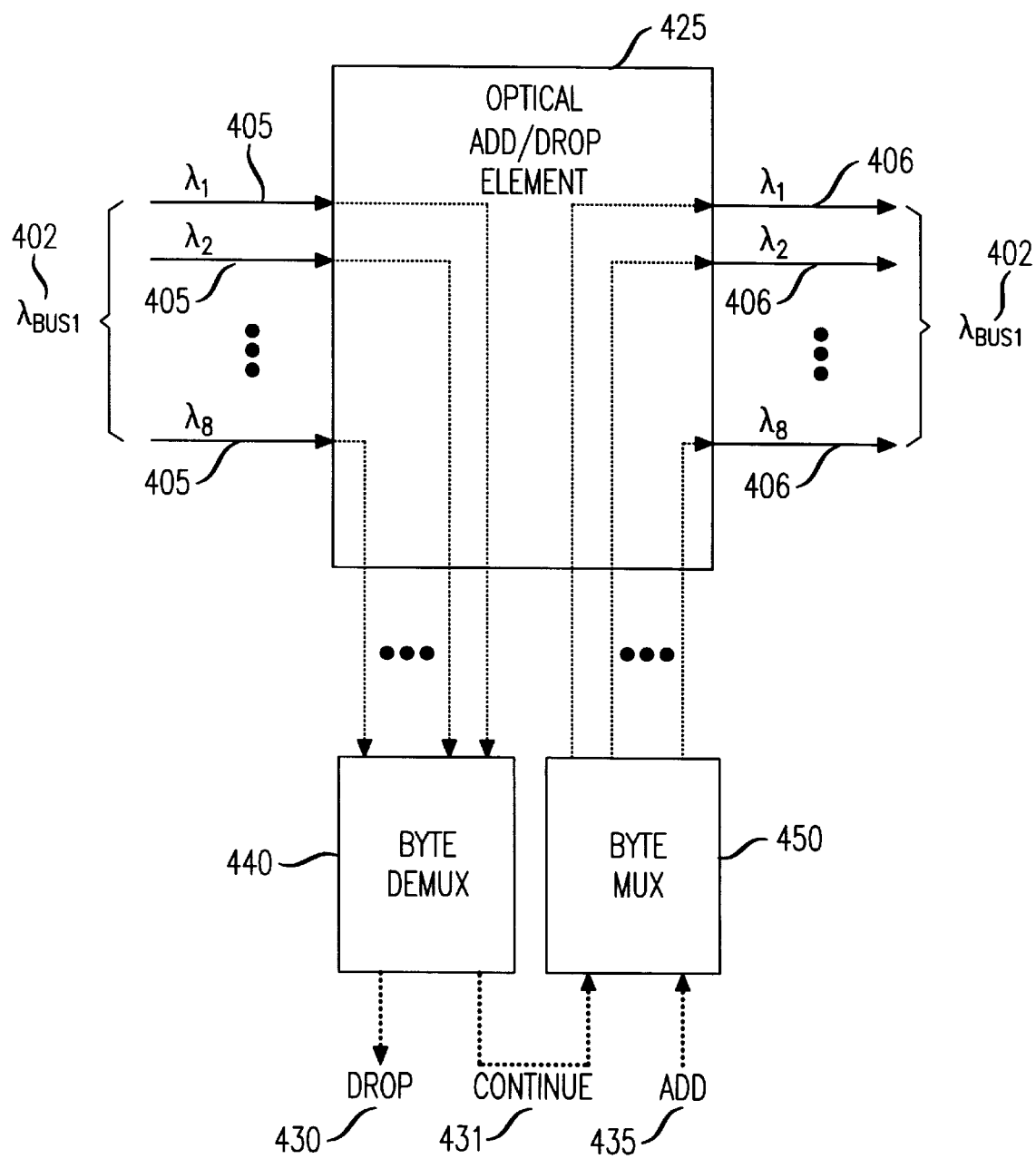
FIGS. 4–5 are simplified block diagrams of other embodiments of add/drop arrangements for use in a system employing the wavelength bus architecture according to the principles of the invention.

In FIG. 4, wavelength bus 402 ($\lambda_{BUS1}$) is allocated for transporting the traffic that is to be dropped and added to the DWDM signal. The other wavelength channels and/or wavelength buses within the DWDM signal have been omitted for simplicity of illustration and explanation. As shown in this exemplary arrangement, wavelength bus 402 ($\lambda_{BUS1}$) includes 8 wavelength channels 405 ($\lambda 1$–$\lambda 8$), and information to be dropped is transported in each of wavelength channels 405 using the previously described wavelength bus architecture. Because each of wavelength channels 405 is used to carry the information to be dropped, add/drop element 425 must be capable of separating all 8 wavelength channels 405 from the DWDM signal. As previously indicated, well-known devices such as reflective fiber gratings, optical circulators, Mach-Zehnder devices, and the like may be used. In this embodiment, wavelength channels 405 are completely reflected or otherwise routed to be dropped in order to avoid wavelength "contamination" or other interference-related problems that may be caused when information is subsequently inserted in these same wavelength channels.

In operation, information to be dropped is transported in wavelength bus 402 in a parallel, byte-interleaved format. As such, wavelength channels 405 must be supplied to appropriate circuitry for optical-to-electrical conversion (not shown) using well-known techniques and byte demultiplexing. In this example, byte demultiplexer 440 demultiplexes the byte interleaved information and can either route selected information for removal via path 430 or route other selected information for re-insertion into the DWDM signal via path 431. In this latter scenario, the dropping and re-insertion of information via path 431 would be the equivalent of a "drop and continue" operation. Information supplied at the add/drop node that is to be inserted into the DWDM signal is added via path 435 to byte multiplexer 450 which byte interleaves the information added via paths 435 and 431 into a parallel format for transport in wavelength bus 402 ($\lambda_{BUS1}$). The operation of byte demultiplexer 440 and byte multiplexer 450 are described in detail in the aforementioned, co-pending U.S. application Ser. No. 09/237,122. The parallel, byte-interleaved information is then converted to an optical format using well-known techniques for transport on wavelength channels 406 ($\lambda 1$–$\lambda 8$). Wavelength channels 406, which now carry the inserted information, are then inserted via add/drop element 425 into the DWDM signal and are transported within the DWDM signal via wavelength bus 402 ($\lambda_{BUS1}$).

Figure 5:
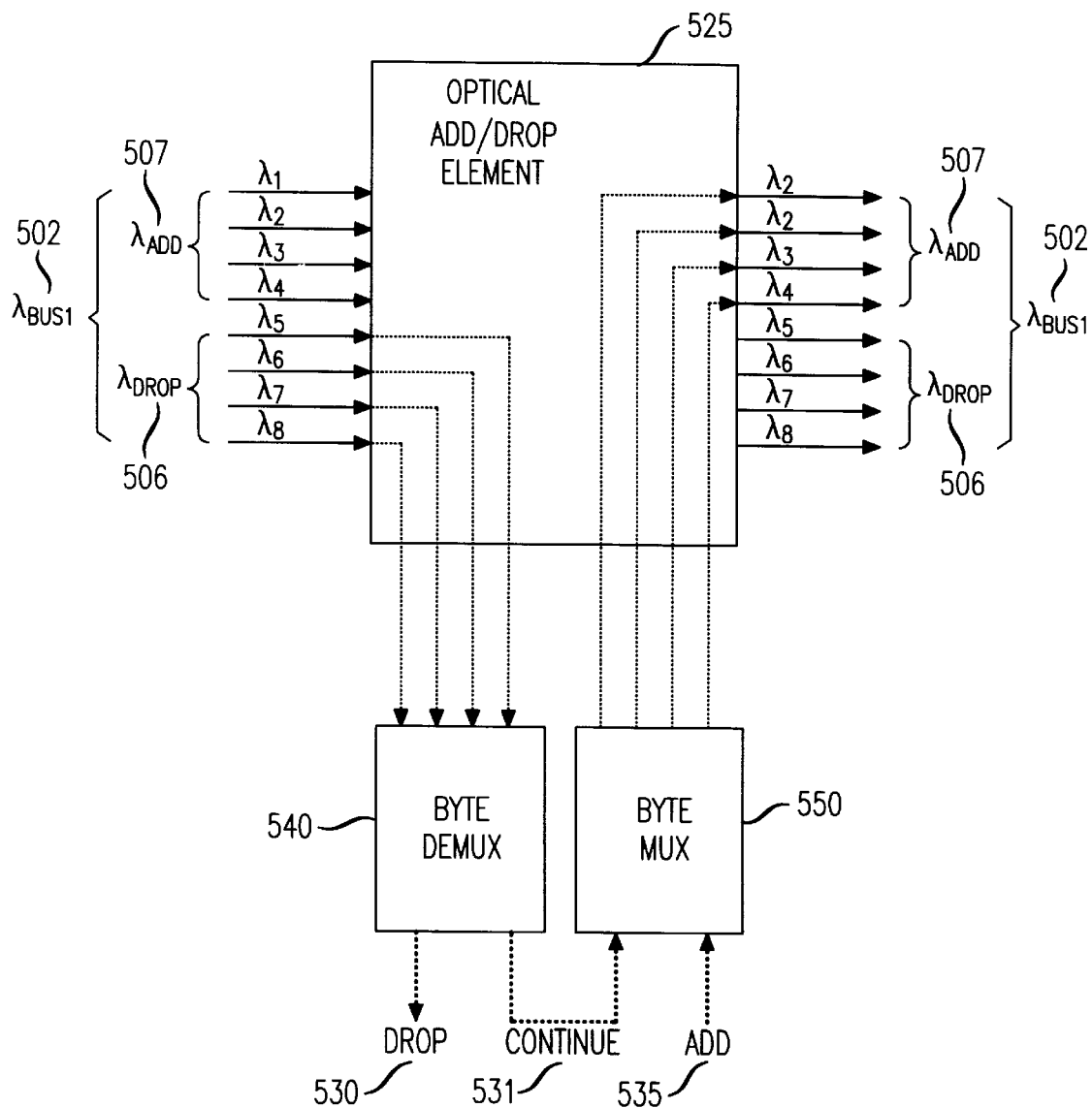

FIG. 5 shows another embodiment of an add/drop arrangement according to the principles of the invention. Because some of the same principles of operation apply to the embodiments in FIGS. 4 and 5, only the differences will be described in detail. As shown, wavelength bus 502 ($\lambda_{BUS1}$) is allocated for carrying the information to be dropped and added from the DWDM signal. Again, the other wavelength channels and/or wavelength buses in the DWDM signal have been omitted for simplicity of illustration and explanation. As shown in this exemplary embodiment, wavelength bus 502 ($\lambda_{BUS1}$) includes 8 wavelength channels $\lambda_1$–$\lambda_8$. However, wavelength bus 502 ($\lambda_{BUS1}$) is further partitioned so that selected ones of the wavelength channels are used for carrying the information to be added to the DWDM signal while other wavelength channels are used for carrying the information to be added to the DWDM signal. In particular, the subset of wavelength channels used for carrying the information to be dropped from the DWDM signal is designated as wavelength group 506 ($\lambda_{DROP}$) and includes wavelength channels $\lambda_5$–$\lambda_8$ and the subset of wavelength channels used for carrying the information to be added to the DWDM signal is designated as wavelength group 507 ($\lambda_{ADD}$) and includes wavelength channels $\lambda_1$–$\lambda_4$.

At the input to add/drop element 525 in one exemplary embodiment, only wavelength channels $\lambda_5$–$\lambda_8$ will be supplying information to add/drop element 525, while wavelength channels $\lambda_1$–$\lambda_4$ will not have any information modulated thereon. In effect, wavelength channels $\lambda_1$–$\lambda_4$ are "dark" prior to add/drop element 525. Similarly, at the output of add/drop element 525, only wavelength channels $\lambda_1$–$\lambda_4$ will be carrying the added information, while wavelength channels $\lambda_5$–$\lambda_8$ will not have any information modulated thereon, e.g., "dark".

As previously indicated, well-known devices such as reflective fiber gratings, optical circulators, Mach-Zehnder devices, and the like may be used. However, because separate wavelength channels are being used to carry the drop and add traffic, passive optical couplers and the like may also be used with this exemplary embodiment. In particular, wavelength channels $\lambda_1$–$\lambda_4$ do not carry any information prior to add/drop element 525, so these channels do not necessarily have to be completely reflected, i.e., blocked, since the information to be supplied at the add/drop node will only be inserted onto previously "dark" wavelengths. Similarly, because information is only being inserted onto wavelength channels $\lambda_1$–$\lambda_4$, wavelength channels $\lambda_5$–$\lambda_8$ also do not have to be completely blocked. In this latter example, passive optical coupling can therefore provide a "drop and continue" function at the optical layer. More specifically, information to be dropped can be tapped off by a passive optical coupler within add/drop element 525 and also passed on a "normal through" path through add/drop element 525 for subsequent transmission.

In operation, information to be dropped that is carried in wavelength group $\lambda_{DROP}$ on wavelength channels $\lambda_5$–$\lambda_8$ is parallel-formatted, byte-interleaved information as previously described. As such, wavelength channels $\lambda_5$–$\lambda_8$ must be supplied to appropriate circuitry for optical-to-electrical conversion (not shown) using well-known techniques and byte demultiplexing as in the previous embodiment. The function and operation of byte demultiplexer 540 and routing of information to be dropped via path 530 and for re-insertion via path 531 is similar to that previously described for byte demultiplexer 440 (FIG. 4) and will not be repeated here for sake of brevity. A notable difference, however, is that passive optical coupling in add/drop element 525, as previously described, provides a "drop and continue" function at the optical layer, while the re-insertion of byte demultiplexed information via path 531 also provides a "drop and continue" function at the electronic layer, thus demonstrating another level of scalability and adaptability for the add/drop capability according to the principles of the invention. In sum, the mix of traffic that can be dropped, continued, and added can even be customized within the wavelength bus itself. Information supplied via path 535 is added to the DWDM signal via byte multiplexer 550 in a similar manner as previously described for the embodiment shown in FIG. 4, except that inserted information is only transported on wavelength channels $\lambda_1$–$\lambda_4$.

Because the two wavelength groups, $\lambda_{DROP}$ and $\lambda_{ADD}$, within wavelength bus 502 ($\lambda_{BUS1}$) each carries its own respective byte-interleaved parallel traffic, any termination of wavelength bus 502 ($\lambda_{BUS1}$) will therefore require the appropriate components, e.g., byte demultiplexers, for each of the wavelength groups $\lambda_{DROP}$ and $\lambda_{ADD}$ in order to separately extract the information on each.

Figure 6:
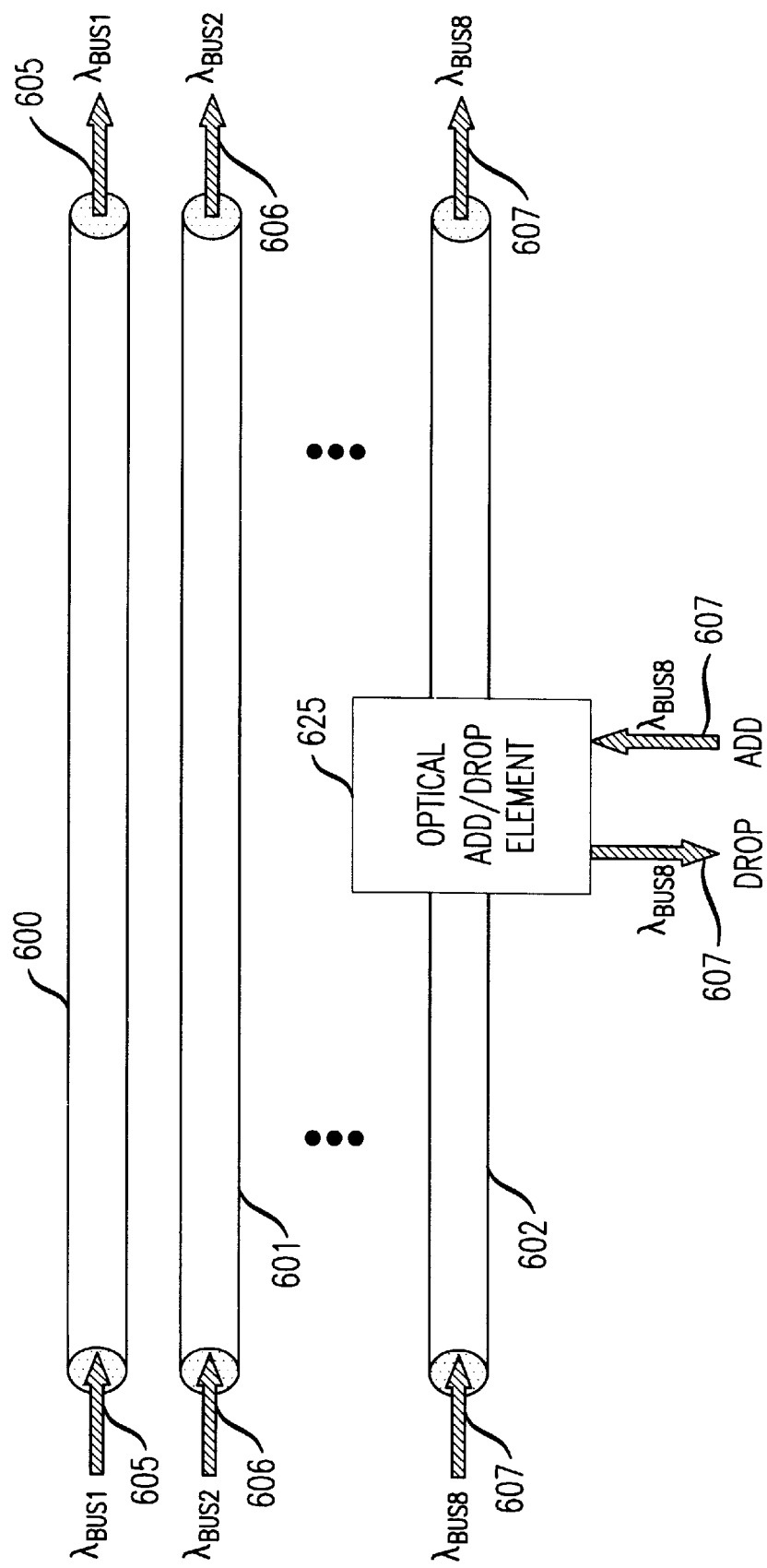
FIG. 6 is a simplified block diagram illustrating an add/drop capability in a system employing a wavelength bus architecture in multiple fibers according to the principles of the invention.

FIG. 6 illustrates another level of scalability that can be achieved with add/drop using the wavelength bus architecture according to the principles of the invention. More specifically, the configuration in FIG. 6 includes a plurality of optical fibers 600–602, each of which transports a DWDM signal having at least one wavelength bus therein. For simplicity of understanding, each of optical fibers 600–602 carries a respective wavelength bus 605–607, shown here as $\lambda_{BUS1}$, $\lambda_{BUS2}$ and $\lambda_{BUS8}$, respectively. It should be noted that only 3 of 8 optical fibers are shown while the remaining optical fibers have been omitted for simplicity of illustration and explanation.

As shown for this exemplary embodiment, optical fibers 600–601 and the respective wavelength buses 605–606 are allocated for carrying express traffic, i.e., no add/drop requirement, while optical fiber 602 is allocated for carrying traffic to be dropped and added in the DWDM signal. Furthermore, only wavelength bus 607 ($\lambda_{BUS8}$) transported within optical fiber 602 is used to provide the add/drop service via add/drop element 625. The principles of operation described above for either of the embodiments shown in FIGS. 4–5 can be applied equally here to wavelength bus 607 within optical fiber 602 and will not be repeated for sake of brevity. However, the significant aspect of this embodiment is that the add/drop capability is provided with at least two levels of selectivity and scalability, at the fiber level and also at the wavelength bus level. For example, a network or system can be configured to provide add/drop service by managing which optical fibers and/or which wavelength buses within those optical fibers are used to carry the add/drop traffic.

This selectivity may be particularly advantageous for add/drop functions in short-haul applications employing fiber ribbon type connectivity between end terminals. Additionally, wavelength reuse is simplified in this approach since the same wavelengths can be used in each optical fiber. Moreover, this type of add/drop arrangement can also be advantageously employed in long-haul applications wherein a single optical line system (OLS) transports DWDM signals in each of a plurality of optical fibers. One example of a long haul application that may advantageously employ this add/drop arrangement is the Lucent Technologies Inc. WaveStar™ OLS 400G system in which 8 separate fibers can each support a DWDM signal having up to 80 wavelength channels of information. It should be noted that while FIG. 6 depicts only an 8-fiber arrangement and has been described in this context, this example is only meant to be illustrative and not limiting in any manner.

The foregoing is merely illustrative of the principles of the invention. Those skilled in the art will be able to devise numerous arrangements, which, although not explicitly shown or described herein, nevertheless embody principles that are within the spirit and scope of the invention. For example, many different types of add/drop elements, now known or later developed, may be used in conjunction with the embodiments shown and described herein. Additionally, the scalability aspects of the wavelength bus architecture described herein illustrate the flexibility of the wavelength bus architecture. As such, numerous modifications in terms of the partitioning of one or more DWDM signals into one or more wavelength buses according to different add/drop requirements will be apparent to those skilled in the art and are contemplated by the teachings herein. Moreover, the principles of the invention described herein are equally applicable to long haul and short haul transmission applications, digital communications systems, computer communications systems, local area network applications, and the like. Accordingly, the scope of the invention is limited only by the claims that follow.

I claim:

1. In a wavelength division multiplexed network, a method for removing and inserting information in a wavelength division multiplexed signal having a plurality of optical channels, the method comprising the steps of:

transporting information in a parallel bus transmission group within the wavelength division multiplexed signal, the parallel bus transmission group including a predetermined number of the plurality of optical channels for carrying multiplexed information supplied by a source in a parallel format, wherein the information is formatted as bytes, each byte having N bits, the transporting step further characterized by byte-wide parallel transmission wherein each optical channel in the parallel bus transmission group carries a corresponding one of the N bits of a byte being transmitted;

at a node in the network, selectively removing byte-wide parallel-formatted information carried in the parallel bus transmission group; and inserting byte-wide parallel-formatted information supplied at the node into the parallel bus transmission group for transmission in the wavelength division multiplexed signal.

2. The method of claim 1, further comprising the steps of:

transporting each of a plurality of wavelength division multiplexed signals in a corresponding optical fiber in the network;

transporting at least one parallel bus transmission group in each of the plurality of wavelength division multiplexed signals, each parallel bus transmission group carrying multiplexed parallel-formatted information therein; and selectively removing and inserting information carried by a parallel bus transmission group in at least one of the plurality of wavelength division multiplexed signals, wherein configurable add/drop service is provided as a function of optical fiber selection and parallel bus transmission group selection.

3. The method of claim 2, wherein the optical fibers comprise a optical fiber ribbon.

4. The method of claim 1, further comprising the steps of:

at the node, separating the optical channels in the parallel bus transmission group carrying the information to be removed from the wavelength division multiplexed signal; and demultiplexing the information to be removed.

5. The method of claim 4, further comprising the steps of:

multiplexing the information to be inserted at the node into a parallel format for transport in the parallel bus transmission group; and at the node, combining the optical channels in the parallel bus transmission group carrying the inserted information with the wavelength division multiplexed signal for transport in the network.

6. The method of claim 5, further comprising the step of multiplexing a predetermined amount of the demultiplexed information removed at the node together with the inserted information supplied at the node.

7. The method of claim 1, wherein each of the optical channels in the parallel bus transmission group is associated with a wavelength, thereby defining a wavelength bus.

8. The method of claim 1, further comprising the step of transporting a plurality of parallel bus transmission groups in the wavelength division multiplexed signal, each of the plurality of parallel bus transmission groups capable of carrying multiplexed parallel-formatted information therein, wherein at least one of the plurality of parallel bus transmission groups is reserved for add/drop service.

9. The method of claim 1, wherein the multiplexed information comprises interleaved bytes of information in a parallel format so that parallel-formatted information supplied by a first source is byte interleaved with parallel-formatted information supplied by at least a second source.

10. In a wavelength division multiplexed network, an add/drop multiplexing arrangement capable of removing and inserting information in a wavelength division multiplexed signal having a plurality of optical channels, the arrangement comprising:

means for transporting information in a parallel bus transmission group within the wavelength division multiplexed signal, the parallel bus transmission group including a predetermined number of the plurality of optical channels for transporting multiplexed information supplied by a source in a parallel format, wherein the information is formatted as bytes, each byte having N bits, the means for transporting being operable to carry out byte-wide parallel transmission wherein each optical channel in the parallel bus transmission group carries a corresponding one of the N bits of a byte being transmitted;

at a node in the network, a means for selectively removing byte-wide parallel-formatted information carried in the parallel bus transmission group; and means for inserting byte-wide parallel-formatted information supplied at the node into the parallel bus transmission group for transmission in the wavelength division multiplexed signal.

11. The arrangement of claim 10, wherein the means for selectively removing information includes:

at the node, a means for separating the optical channels in the parallel bus transmission group carrying the information to be removed from the wavelength division multiplexed signal; and a demultiplexer coupled to the means for separating, the demultiplexer capable of demultiplexing parallel-formatted information contained in the parallel bus transmission group.

12. The arrangement of claim 11, wherein the means for inserting information supplied at the node includes:

a multiplexer capable of receiving parallel-formatted information supplied by at least one source and multiplexing the parallel-formatted information for transport in the parallel bus transmission group; and at the node, means for combining the optical channels in the parallel bus transmission group carrying the inserted information with the wavelength division multiplexed signal for transport in the network.

13. The arrangement of claim 12, wherein the multiplexer is capable of multiplexing a predetermined amount of the demultiplexed information removed at the node together with the inserted information supplied at the node.

14. The arrangement of claim 11, wherein the means for separating includes a passive optical coupler capable of tapping off the optical channels in the parallel bus transmission group carrying the information to be removed from the wavelength division multiplexed signal.

15. The arrangement of claim 11, wherein the means for separating comprises an optical filter capable of filtering the optical channels in the parallel bus transmission group carrying the information to be removed from the wavelength division multiplexed signal.

16. The arrangement of claim 10, further comprising means for transporting a plurality of parallel bus transmission groups in the wavelength division multiplexed signal, each of the plurality of parallel bus transmission groups capable of carrying multiplexed parallel-formatted information therein, wherein at least one of the plurality of parallel bus transmission groups is reserved for add/drop service.

* * * * *